United States Patent Office 3,283,908
Patented Nov. 8, 1966

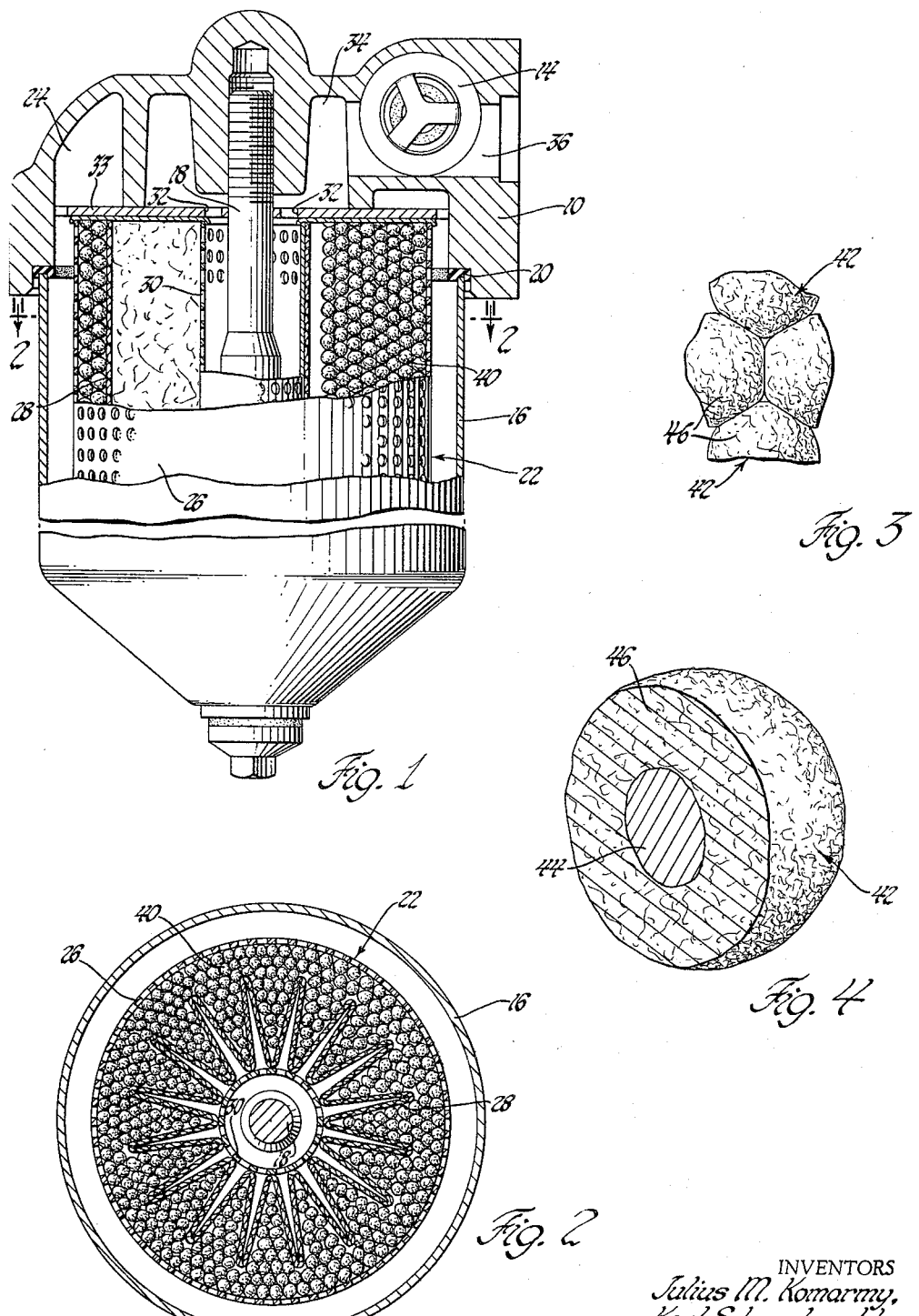

3,283,908
NODULAR FILTER MASS OF PREDETERMINED VOLUME
Julius M. Komarmy, Flint, Karl Schwartzwalder, Holly, and George E. Suchy, Flint, Mich., assignors to General Motors Corporation, Detroit, Mich., a corporation of Delaware
Filed Dec. 30, 1963, Ser. No. 334,194
2 Claims. (Cl. 210—266)

This invention relates to filters and more particularly to a mass of filter material in the form of nodules presenting a large filtering capacity with respect to volume of the filter unit required and which is suitable for use in depth-type filters.

The present invention pertains to a mass for clarifying diverse forms of fluids. One form for which it is especially adapted is lubricating oil such as used in an automobile engine. In such oils, atmosphere dust and road dirt are carried into the oil with ventilation and combustion air. Casting sand mill scale from manufacturing as well as metallic fines from engine break-in and wear often are deposited in the oil. Lubricating oil deterioration products from natural breakdown or engine misuse, fuel combustion by-products, breakdown products of complex oil additives, coolant leakage deposits and other impurities should be filtered from the oil for the protection of engine parts and preferably without removing added and desired agents such as detergents present in oil. Another problem is the corrosive attack which occurs whenever an engine cylinder surface is cold enough to cause water to condense from the combustion gases. Products of combustion combine with the water imparting an acid reaction which leads to deterioration of the cylinder walls, pistons and piston rings.

Many filter structures have been proposed in the past to promote removal of impurities in fluids such as lubricating oil but all have had deficiencies. One of the most commonly used structures is that of pleated paper which depends on the size of the openings in the paper. In this case, the initial use of the filter is accompanied with poor filtration efficiency insofar as the removal of fines is concerned and this continues until a filter bed of dirt is built up on the paper and when this is accomplished so that the efficiency in fines is at a maximum, the filter element must be replaced as its resistance to flow of oil is too great. Depth-type filters are also used but in this case the filtration depends upon the density of the compact material. When such materials are packed tightly, the filter has a short life. When the materials are loosely packed, the filtration is poor and the filter units employed must be larger than desired.

An object of the present invention is to provide an improved and compressed filter mass having a prolonged filter life potential with an accompanying maintenance of a high efficiency in its ability to clarify fluids such as lubricating oil. Another object is to provide a filter having the capacity within a limited volume of restraining the passage of fines without unduly restricting fluid flow thereby obtaining a maximum of filter effectiveness and useful life in a small filter unit.

A feature of the present invention is a compressed mass of discrete nodules, each nodule comprising a dimensionally stable nucleus and a relatively thick coating of fibers enclosing the nucleus. Another feature is a mass of nodules in which relatively loose fibers are attached to a relatively hard nucleus of each nodule but extend outwardly therefrom as a compressible or distortionable layer. Another feature is a mass of nodules each having a rigid nucleus with a diameter in the range of about $1/32$ to $3/16$ of an inch and a surrounding porous layer of fibers with the ratio of nodule diameter to the nucleus diameter coming within the range of about 1.2 to 2.0. Another feature is a mass of nodules each having a hard nucleus giving a predetermined volume to the mass when the latter is subjected to compression. Another feature is a mass of nodules in which porous fibers and magnetic particles are included. One other feature is a combination of a mass of fluid permeable nodules having hard nuclei separated by a maze of fibers distorted by pressure and defining flow paths between the nuclei and leading to a fluid permeable sheet arranged on one side of the mass. Another feature is a filter in which a permeable sheet with pleats therein is in the form of an annulus and in which those pleats are separated and surrounded by a fluid permeable mass capable of restraining a flow of fines to the pleats.

In the drawings:

FIGURE 1 is an elevation view of a filter including a compressed filter mass in which the features of the present invention are embodied, the filter being shown on a mounting for supplying and withdrawing fluid and portions of the filter and mounting being broken away better to illustrate the construction;

FIGURE 2 is a sectional view looking in the direction of the arrows 2—2 in FIGURE 1;

FIGURE 3 is an enlarged view of portions of a few nodules compressed together in making up the filter mass of FIGURE 1;

FIGURE 4 is a greatly enlarged perspective view of a portion of a nodule showing its hard nucleus and thick, fibrous and distortionable covering.

FIGURE 1 shows a support casting 10 having a conventional differential pressure operated bypass valve 14 and a filter casing 16 which is attachable to the support casting 10 by means of a bolt 18. The casing 16 is retained in tight relation with the casting 10 with the aid of a sealing gasket 20. A filter element is generally indicated at 22 and is so retained within the casing 16 that fluid entering from an annular chamber 24 of the casting 10 will surround the filter element 22 and be in position to penetrate the perforated outer cover 26 of the filter element and then pass through filter element 28 of the pleated paper variety and then through a central perforated tube 30 and pass upwardly by way of openings 32 in a plate 33 to an annular and inner chamber 34 in the casting 10. The purified oil may then flow out by way of a passage 36 to the engine. The valve 14 is so arranged that if the filter element 22 becomes plugged, the fluid pressure across the element 22 will rise and the valve will open and the filter element 22 will be bypassed by the fluid as is a well-known expedient.

The present invention is primarily concerned with the nature of the compacted mass 40 of nodules 42 and secondarily as packed in between the perforated outer cover 26 and the walls of the diverging pleats of the filter paper element 28 as shown in FIGURES 1 and 2. In a given instance, the compacting may cause the walls of each pleat to come together but this is of no moment as the material of the two walls is chosen with such a texture or rough surface as to provide adequate flow passages at the interface of the two walls. In this arrangement, the flow of clarified fluid may be greatly enhanced as the nodules between the pleats prevent premature blocking of the pores in the pleats by the fines. Although such a combination is preferred, the mass of nodules of this invention may also advantageously be employed in a sock-type filter element such as that disclosed in the United States Patent No. 2,781,914, granted February 19, 1957, in the name of J. H. DeVoe, or the parallel pleat type as disclosed in United States Patent No. 2,768,752, granted October 30, 1956.

The nature of the nodules of the mass 40 is best illustrated in the enlarged views of FIGURES 3 and 4. Each nodule 42 comprises a hard or dimensionally stable nucleus which is indicated at 44 in FIGURE 4. This nucleus is one of the "rigid balls" produced as described above. As heretofore stated, such a nucleus may be impervious or pervious to the fluid being treated. An exterior layer of comparatively loose fibers is indicated at 46 and this layer is thick and held to the hard nucleus 44 by mere mechanical containment of the latter and possibly but not necessarily by an adhesive action of the resin employed. If the entire structure of each nodule 42 is to have filtering capacity, then its complete structure including the nucleus 44 must be permeable to the fluid being clarified but this is not as important as the rigidity of the nucleus.

As one example, for practicing the present invention cotton linter balls to serve as nuclei (see the nucleus 44 of FIGURE 4) are prepared by tumbling fibers of cotton in a rotating cylindrical container or on a disk at such speed and angle of inclination of the container or disk axis as to obtain a consistent rolling effect. During the rolling process, a solution of alcohol and resin is sprayed into the container. The size of the cotton linter nuclei is readily determined in this manner and after these steps are completed, the balls are placed into an oven and heated 300° F. (dependent upon the resin) in order to cure the resin and care being taken that the balls remain discrete and flowable. Upon curing the resin and evaporating the solvent, a mass of rigid and discrete balls 44 of considerable dimensional stability and of desired controlled porosity is obtained. The degree of porosity exhibited by the cured balls or "rigid balls" 44 is determined by the amount of resin used but dimensional stability is deemed more important than porosity. The present invention may well be practiced with nuclei substantially impervious to the fluid to be filtered and magnetite or barium ferrite may be used in the nuclei material to impart magnetic properties ultimately to aid removing particles from fluids to be treated.

The diameters of the hard balls 44 are made substantially uniform but their preferred diameters should fall within the range of $\frac{1}{32}$ to $\frac{3}{16}$ of an inch approximately and the diameter of each nodule is made from about 1.2 to about 2 times that of its hard nucleus. This range of sizes influences the flow rate of fluid through a compact mass of the nodules.

After the mass of rigid balls each similar to the nucleus 44 are obtained, cotton linters are tumbled in a rotating cylindrical container at a controlled speed and angle of inclination of the container axis. The intended nuclei formed as set forth above have relatively smooth surfaces which are treated with a solvent containing a suitable resin. Excess solvent and resin is drained away and the hard wet-surfaced balls are introduced into a rotating cylinder handling loose fibers. The balls are added to the tumbling loose fibers until the latter are accreted or agglomerated into a thick covering around each ball. Curing of the limited supply of resin in the loose fiber coverings completes the process of making the nodules 42. The nodules 42 do not adhere to each other as added fibers are utilized to separate them as tumbling is continued while the curing is completed. A phenolic-formaldehyde resin is suitable for use in the nuclei or the nodules covering material and this is so particularly of the filter mass is to be used for lubricating oil purification.

The nature, lengths of and number of the fibers in the layer 46 are such that the fibers will form a fluid permeable and distortionable maze adequate, upon being compacted, substantially to fill useless space otherwise existing between the nodules of the mass before the compacting. The fibers to be used in forming the covering 46 of each nodule may be composed of cotton linters, wool, synthetic replacements for cotton and wool, or natural cellulose fibers, and mixtures of these may be employed. Inorganic fibers such as glass, alumina, mullite, barium titanate alone or in combination may also be used.

The proportioning of the total diameter of each nodule 42 to the diameter of its nucleus 44 within the range of from about 1.2 to about 2.0 substantially predetermines the volume of a mass of such nodules which may be compacted into a given filter unit. If the diameter of each nucleus 44 were smaller with reference to the nodule 42, the mass of such nodules would become so compacted when pressurized that flow of fluid therethrough would be unduly impeded and the filter mass life would be short. If the diameter of each nucleus 44 were larger with reference to the nodule diameter then there would be an undue loss of filter space and also a failure of the porous filter covering material 46 of a compacted mass of the nodules more fully to eliminate useless void space which would exist between the nodules before the compacting. With the ratio of from about 1.2 to about 2.0, however, there is a practical limit to the application of compacting pressure at which limit the mass volume will be sustained by the nuclei and the bridging effect between the latter of compressed covering material and existing at several radial zones of the covering layer of fibers of each nodule. Other radial zones of the covering layer of each nodule will be under no or less pressure as they are not so closely backed by the nucleus. The predetermined compacted volume is thus easily obtained for a given number or uncompacted mass of the nodules by the application of pressure to the mass and that volume presents a mass structure with a maximum filtering capacity for a given filter unit in which it is employed.

Examination of the nodules after use in a compacted filter mass shows that dirt particles have penetrated and are deposited within the structure of each nodule covering. A large filtering capacity is attained in a given filtering zone because of the great number of fibrils intimately exposed to the fluid and this gives a long life expectancy for the mass.

In realizing some of the advantages of using a distortionable maze of fibers around each nucleus, it has been found that ferrite or activated alumina or other materials which absorb water may used. If water absorptive material is utilized, the combination is particularly advantageous in filtering gasoline and in the case of lubricants, the water absorptive media minimizes the formation of acid which corrodes engine parts.

We claim:

1. A filter mass of discrete nodules, each of said nodules comprising a hard nucleus and a relatively soft and porous covering, the ratio of module diameter to nucleus diameter being in the range of from about 1.2 to about 2.0 and the diameter of said nucleus coming within the range of from $\frac{1}{32}$ to $\frac{3}{16}$ of an inch approximately.

2. A filter comprising a mass of fluid permeable and discrete nodules distorted together under pressure, each of said nodules having a covering of filter material and a hard nucleus, the space between the nuclei of said mass being substantially filled with said filter material due to said pressure, the ratio of nodule diameter to nucleus diameter being in the range of from about 1.2 to about 2.0, the diameter of said nucleus being within the approximate range of from $\frac{1}{32}$ to $\frac{3}{16}$ of an inch, and fluid permeable wall means retaining said mass under said pressure.

References Cited by the Examiner

UNITED STATES PATENTS 3,212,641 10/1965 Komarmy et al. _____ 210—266
3,219,194 11/1965 Schwartzwalder et al. _ 210—508

REUBEN FRIEDMAN, *Primary Examiner.*

SAMIH ZAHARNA, *Examiner.*